US012806861B2

(12) United States Patent
Cardon

(10) Patent No.: US 12,806,861 B2
(45) Date of Patent: Nov. 24, 2026

(54) ADDITIVE MANUFACTURING SYSTEM AND METHOD USING ROBOTIC ARMS

(71) Applicant: THE BOEING COMPANY, Chicago, IL (US)

(72) Inventor: Lisa A. Cardon, Auburn, WA (US)

(73) Assignee: The Boeing Company, Arlington, VA (US)

( * ) Notice: Subject to any disclaimer, the term of this patent is extended or adjusted under 35 U.S.C. 154(b) by 76 days.

(21) Appl. No.: 18/987,966

(22) Filed: Dec. 19, 2024

(65) Prior Publication Data

US 2025/0121564 A1 Apr. 17, 2025

Related U.S. Application Data

(62) Division of application No. 16/718,886, filed on Dec. 18, 2019, now Pat. No. 12,214,554.

(51) Int. Cl.

| | |
|---|---|
| ***B29C 64/379*** | (2017.01) |
| ***B29C 64/209*** | (2017.01) |
| ***B29C 64/245*** | (2017.01) |
| ***B33Y 10/00*** | (2015.01) |
| ***B33Y 30/00*** | (2015.01) |

(52) U.S. Cl.
CPC .......... *B29C 64/379* (2017.08); *B29C 64/209* (2017.08); *B29C 64/245* (2017.08); *B33Y 10/00* (2014.12); *B33Y 30/00* (2014.12)

(58) Field of Classification Search
CPC ... B29C 64/379; B29C 64/245; B29C 64/209; B33Y 10/00; B33Y 30/00
See application file for complete search history.

(56) References Cited

U.S. PATENT DOCUMENTS

2017/0217100 A1* 8/2017 Gardiner .............. B29C 64/209

FOREIGN PATENT DOCUMENTS

CN 106163771 * 11/2016

* cited by examiner

*Primary Examiner* — Edmund H Lee
(74) *Attorney, Agent, or Firm* — Joseph M. Butscher; Carroll, Hoette & Butscher, LLC

(57) ABSTRACT

An additive manufacturing system includes a first robotic arm and a print head with a nozzle. The first robotic arm is configured to hold a build part during a build process. The print head is configured to deposit source material layer by layer during the build process to construct the build part. The first robotic arm is configured to reorient the build part relative to the print head during the build process to modify an angle of a surface layer of the build part relative to the print head.

20 Claims, 7 Drawing Sheets

ADDITIVE MANUFACTURING SYSTEM AND METHOD USING ROBOTIC ARMS

CROSS-REFERENCE TO RELATED APPLICATIONS

This application is a divisional of U.S. patent application Ser. No. 16/718,886, filed Dec. 18, 2019, now U.S. Pat. No. 12,214,554, which is incorporated by reference herein in its entirety.

FIELD OF THE DISCLOSURE

Embodiments of the present disclosure generally relate to additive manufacturing of three-dimensional build parts.

BACKGROUND

Additive manufacturing refers to any process for manufacturing a three-dimensional build part in which successive layers of material are deposited under computerized control. The deposited layers fuse to pre-existing portions of the build part by applying heat, a laser beam, or the like. The size and shape of the build part can be based on a three-dimensional computer model or another electronic data source. Additive manufacturing can be used to fabricate objects that have complex structures and shapes. Additive manufacturing techniques for fabricating metal build parts can allow greater design freedom and yield more precise and repeatable finished products than conventional metal manufacturing techniques, such as die-casting, extruding, milling, and the like. Relative to conventional metal manufacturing techniques, such as milling, additive manufacturing techniques also may produce less material waste.

Build parts that are designed to include certain features, such as voids (e.g., channels, cavities, and the like) and projecting appendages, often require the formation of supports during the build process to mechanically support the construction of the appendages and voids. The supports are removed from the build part after the additive manufacturing build process, and the removal process can be costly, difficult, time intensive, and/or labor intensive. For example, the supports may need to be cut and grinded away from the surfaces of the build part, which can be especially difficult to do in certain hard-to-reach areas such as internal cavities. The task of removing the supports post-build reduces manufacturing efficiency and increases production costs. Furthermore, residual material from the supports left intact on the build part may degrade the quality of the finished product.

SUMMARY OF THE DISCLOSURE

In one or more embodiments of the present disclosure, an additive manufacturing system is provided that includes a first robotic arm and a print head with a nozzle. The first robotic arm is configured to hold a build part during a build process. The print head is configured to deposit source material layer by layer during the build process to construct the build part. The first robotic arm is configured to reorient the build part relative to the print head during the build process to modify an angle of a surface layer of the build part relative to the print head.

In one or more embodiments of the present disclosure, a method for additive manufacturing using robotic arms is provided that includes controlling a first robotic arm to hold a build part suspended above a floor. The method includes depositing source material layer by layer on the build part from a nozzle of a print head to construct the build part during a build process. The method also includes controlling the first robotic arm to move the build part relative to the print head and the floor during the build process to modify an angle of a surface layer of the build part relative to the print head and the floor.

In one or more embodiments of the present disclosure, an additive manufacturing system is provided that includes a first robotic arm and a second robotic arm. The first robotic arm is mechanically coupled to a first print head. The first print head is configured to deposit source material layer by layer on a build part during a build process to construct the build part. The second robotic arm is mechanically coupled to a second print head. The second print head is also configured to deposit the source material layer by layer on the build part during the build process to construct the build part. The first robotic arm moves the first print head relative to the build part during the build process, and the second robotic arm moves the second print head relative to the build part during the build process. The first and second print heads concurrently deposit the source material on the build part.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
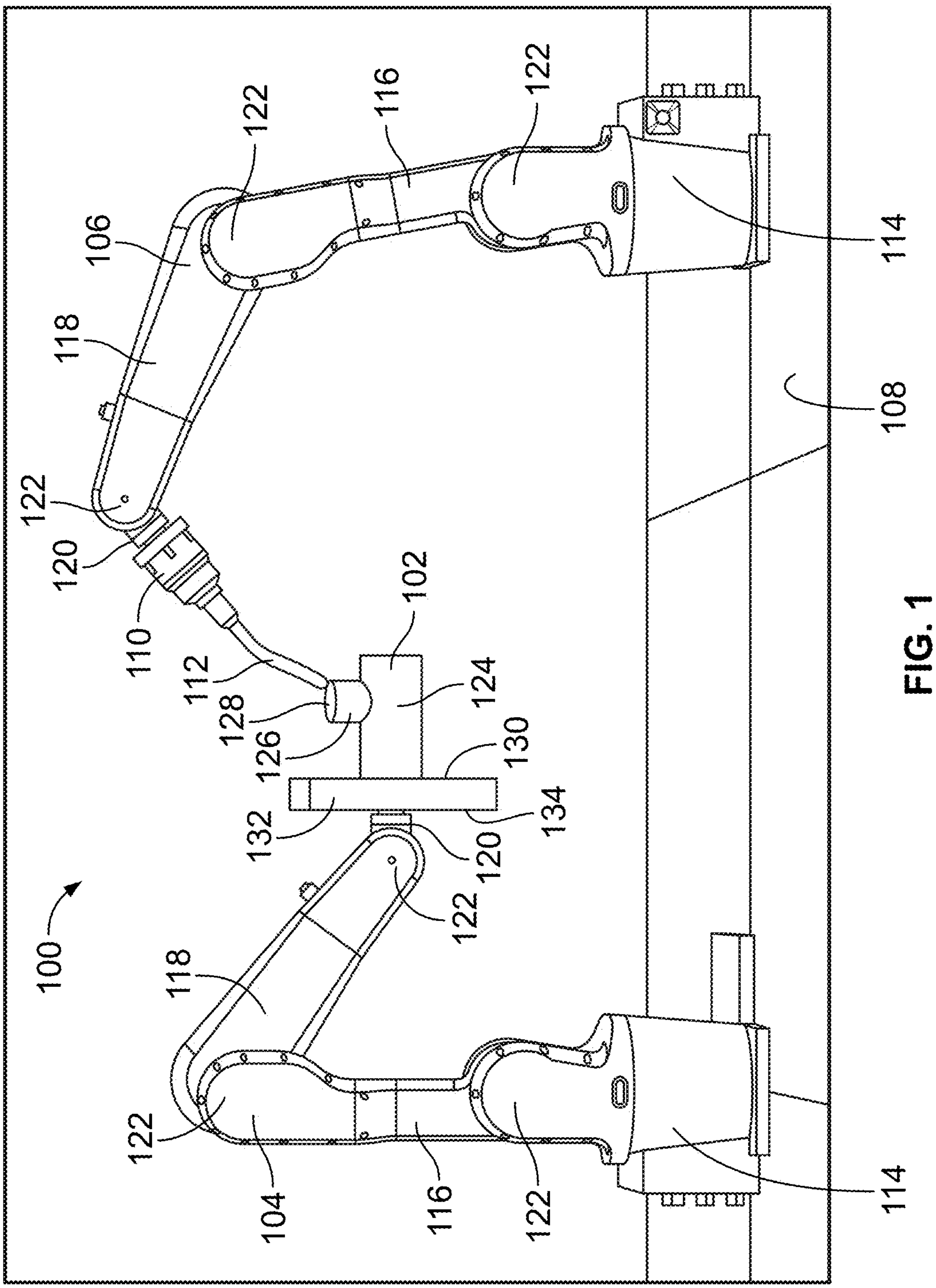
FIG. 1 is a perspective view of an additive manufacturing system according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In consideration of the cost, time, and labor of performing finishing treatments after the build process to grind away extraneous material, such as supports, to polish various surfaces, and the like, there are advantages in techniques for additively manufacturing build parts with less support material and improved surface quality. Reducing the amount of support material formed and improving the surface quality of the build part can eliminate or at least expedite post-build finishing treatments.

Embodiments of the present disclosure provide a system (e.g., an additive manufacturing system) and method for performing additive manufacturing using robots. In one or more embodiments, multiple robots are utilized. The robots perform different tasks for additively manufacturing a build part, such as holding and manipulating the build part that is being constructed, holding and manipulating a print head that fuses source material to the build part, and holding and manipulating a finishing instrument (e.g., a grinder, polishing wheel, and the like). The robots can move with coordinated movements along multiple (e.g., six) degrees of freedom relative to a stationary reference, such as the floor or ground. The movements can be based on a designated movement path within a build plan. The embodiments described herein can utilize only a single robot, two robots, three robots, or more to perform the various additive manufacturing tasks to construct the build part. For example, it is possible for one robot to perform multiple different tasks, as described herein.

The one or more robots of the additive manufacturing system and method described herein are configured to reorient the build part relative to the print head at least once during the build process to modify an angle of a surface layer of the build part relative to the print head. The build process refers to the stage during which the print head deposits material layer by layer to gradually increase the size of the build part by aggregation of layers. The surface layer refers to the most recent layer deposited on the build part. By using robots to reorient the build part relative to the print head during the build process, several benefits can be achieved including eliminating or at least reducing the amount of supports needed. For example, the build part can be reoriented to construct an appendage of the build part at an angle that does not require the formation of associated support material. Reducing the amount of support material can increase the efficiency of the additive manufacturing process and reduce costs by reducing the time and material used during the build process and avoiding or at least reducing post-build finishing tasks to remove support material from the build part. Another benefit of using robots to reorient the build part and/or the print head during the build process is that, by changing the angle of application at which the source material is fused to the build part, the surface quality of the build part can be improved. For example, some angles of application may result in worse surface quality of the build part than other angles of application depending on various factors. Selectively reorienting during the build process to achieve preferred angles of application can increase manufacturing efficiency and reduce costs by eliminating or at least expediting post-build surface finishing treatments, such as polishing or sanding.

FIG. 1 is a perspective view of an additive manufacturing system 100 according to an embodiment of the present disclosure. The additive manufacturing system 100 is configured to perform an additive manufacturing build process to construct a build part 102. The additive manufacturing system 100 can include one or more robots. A first robotic arm 104 and a second robotic arm 106 are shown in FIG. 1 and represent discrete robots. The first robotic arm 104 holds the build part 102. For example, the first robotic arm 104 may carry the build part 102 suspended above a floor 108 or ground if located outdoor. The build part 102 may be partially completed in FIG. 1. The second robotic arm 106 holds a print head 110. The print head 110 includes a nozzle 112 for depositing source material on the build part 102 at controlled locations during the build process. For example, the nozzle 112 is configured to deposit source material layer by layer during the build process to construct the build part 102. The first robotic arm 104 is configured to reorient the build part 102 relative to the print head 110 during the build process to modify an angle of a surface layer 128 of the build part 102 relative to the print head 110.

In an embodiment, both the first robotic arm 104 and the second robotic arm 106 are independently configurable to move along multiple (e.g., six) degrees of freedom relative to each other (and to the floor 108). Both robotic arms 104, 106 have a similar construction in FIG. 1, including a base section 114 disposed on the floor 108, an intermediate elongated member 116, a distal elongated member 118, and an end 120. The intermediate elongated member 116 is mechanically coupled between the base section 114 and the distal elongated member 118. The end 120 is mechanically coupled to the distal elongated member 118. The various components 114, 116, 118, 120 are rotatable relative to each other at respective joints 122 to provide the multiple degrees of freedom. The movements of robotic arms 104, 106 can be motivated by motors and mechanical linkages, including gears, which enable the movements to be precise and repeatable. The movements of the robotic arms 104, 106 can be coordinated with each other such that the movement of the second robotic arm 106 can be based, at least in part, on the movement of the first robotic arm 104, or vice-versa. Furthermore, the movements of the robotic arms 104, 106 are based on a build plan that designates instructions for additively manufacturing the build part 102 according to a selected design of the build part 102. The build plan may be generated in consideration of the ability to reorient the build part 102 during the build process.

According to the embodiments described herein, the first robotic arm 104 is controlled to reorient the build part 102 relative to the second robotic arm 106 and the print head 110 thereon during the build process. For example, the orientation of the build part 102 shown in FIG. 1 can represent a first orientation. The build part 102 that is shown in FIG. 1 has a main body 124 and an appendage 126 that projects from the main body 124. The main body 124 and the appendage 126 optionally may be cylindrical and hollow. The appendage 126 is oriented about a central axis that is perpendicular to a central axis of the main body 124. In FIG.

1, the nozzle 112 of the print head 110 is located proximate to a surface layer 128 of the appendage 126 for depositing source material onto the appendage 126 to grow the appendage 126. In the first orientation shown in FIG. 1, the surface layer 128 and additional layers stacked thereon are oriented parallel to the floor 108 (e.g., perpendicular to a direction of gravitational force). The first orientation allows for constructing the appendage 126 without the formation of support material. For example, the source material is applied in annular layers parallel to the floor 108, so gravity-induced flow of the deposited material is negligible. No part of the appendage 126 is overhanging when in the first orientation.

After the appendage 126, or a section thereof, is completed, the first robotic arm 104 reorients the build part 102 relative to the second robotic arm 106, which modifies the angle of the surface layer 128 of the appendage 126 relative to the print head 110. The first robotic arm 104 translates, tilts, and/or rotates the build part 102 to a second orientation, which is not shown in FIG. 1. The second robotic arm 106 optionally may also reposition. In the second orientation of the build part 102, the nozzle 112 of the print head 110 deposits additional layers of source material on the build part 102. The additional layers may be deposited on the main body 124 or the appendage 126 of the build part 102. In a non-limiting example, the print head 110 may begin constructing another appendage that projects from the main body 124 at a different location and/or different angle than the appendage 126. The second orientation can be selected to avoid the formation of support material while constructing the second appendage. The additional layers of source material deposited on the build part 102 while the build part 102 is in the second orientation can be parallel to each other and transverse to the layers of the source material that form the appendage 126, as shown and described in more detail herein.

In one or more embodiments, the build part 102 is secured on a surface 130 of a plate 132 that is planar. The first robotic arm 104 indirectly holds the build part 102 via the plate 132 and reorients the build part 102 by reorienting the plate 132. The end 120 of the first robotic arm 104 is mechanically coupled to the plate 132. The end 120 may be bolted or clamped to the plate 132 or may grasp the plate 132. The end 120 can engage a back surface 134 of the plate 132 opposite the surface 130 on which the build part 102 is located, as shown in FIG. 1. Optionally, the end 120 can extend around an edge of the plate 132. The build part 102 can be secured to the surface 130 of the plate 132 via a welded connection, an adhesive, or the like. In an alternative embodiment, the first robotic arm 104 may hold the build part 102 directly without having the plate 132, which may be particularly useful for additively manufacturing features in situ onto a pre-formed object. For example, the first robotic arm 104 can be controlled to pick up and hold a pre-formed object, such as a pipe, and the second robotic arm 106 and print head 110 can be controlled to weld additional features onto the pipe while the pipe is held by the first robotic arm 104.

The additive manufacturing system 100 in FIG. 1 can perform various additive manufacturing techniques. Suitable additive manufacturing processes can include, for example, material extrusion, directed energy deposition, or material jetting. Material extrusion involves extruding source material through a nozzle in tracks or beads that are deposited on the build part. Examples of material extrusion can include fused filament fabrication and fused deposition modeling. Directed energy deposition involves feeding a powder or wire source material into a melt pool that is generated on the surface of the build part, and the source material adheres to the underlying layers by using an energy source such as a laser or electron beam. Material jetting can involve depositing droplets of material layer by layer, such as a photocurable resin or a thermally molten material, and then actively or passively solidifying the material.

Figure 2:
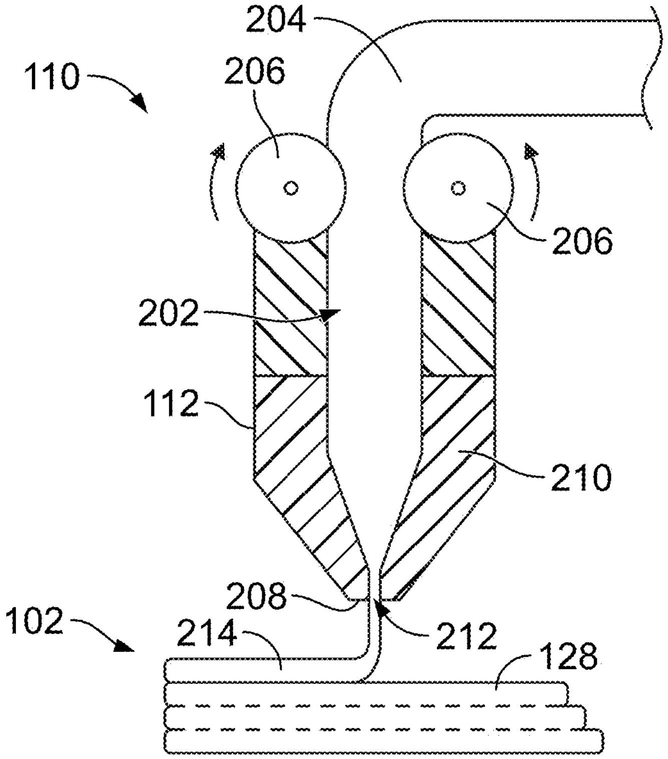
FIG. 2 illustrates a close-up view of a print head according to an embodiment of the additive manufacturing system.

FIG. 2 illustrates a close-up view of the print head 110 according to an embodiment of the additive manufacturing system 100. The nozzle 112 is shown in cross-section to show an internal channel 202 through the nozzle 112. The source material 204 can be a filament or bead of material. The material may include or represent a polymer, a metal, or a ceramic. The source material 204 is supplied from a dispenser which may be coupled to or within the second robotic arm 106 shown in FIG. 1. The print head 110 may include feed rollers 206 that engage the source material 204 and rotate to urge the source material 204 towards a tip 208 of the nozzle 112. The nozzle 112 includes a heating block 210 proximate to the tip 208. The heating block 210 is configured to increase the temperature of the source material 204 within the channel 202 to reduce the viscosity of the source material 204. The channel 202 may taper towards the tip 208 such that the tip 208 defines a narrow opening 212 for depositing the source material 204. The source material 204 can be deposited as heated bead 214 which fuses or bonds to the preceding layer (e.g., the surface layer 128) of the build part 102. Upon cooling and solidifying, the bead 214 forms a new layer of the build part 102.

Figure 3:
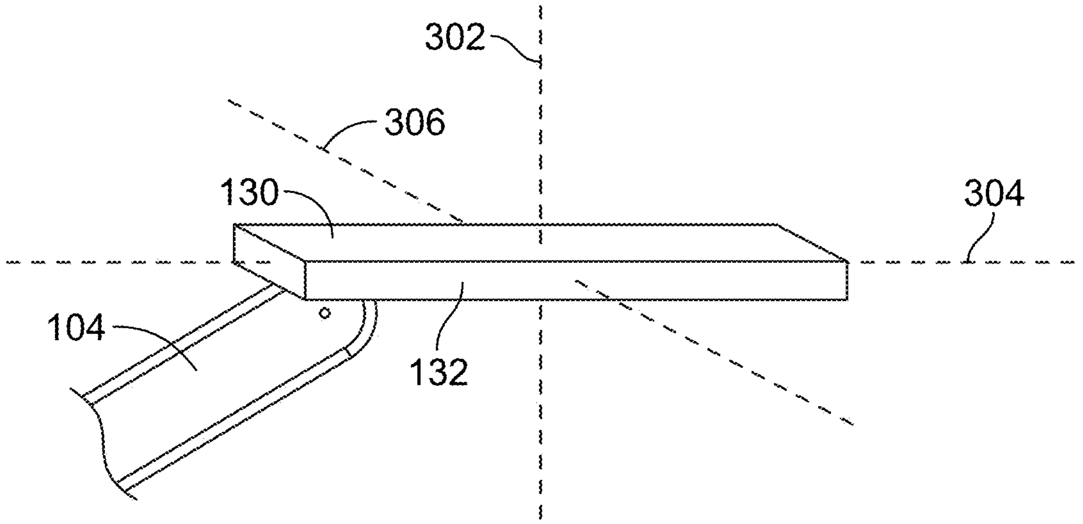
FIG. 3 illustrates an initial stage of an additive manufacturing process using the additive manufacturing system shown in FIG. 1 according to an embodiment.

FIGS. 3-7 illustrate different stages of an additive manufacturing process according to an embodiment using the additive manufacturing system 100 shown in FIG. 1. FIG. 3 illustrates an initial stage of the additive manufacturing process. During the initial stage, the first robotic arm 104 moves or maintains the plate 132 in a first orientation suspended above the floor or ground. The first robotic arm 104 is able to rotate the plate 132 about a vertical axis 302, a lateral axis 304, and a longitudinal or depth axis 306. The axes 302, 304, 306 are mutually-perpendicular. The vertical axis 302 may be parallel to a direction of gravity (e.g., gravitational force). In the illustrated first orientation, the surface 130 of the plate 132 may be parallel to the floor and perpendicular to the vertical axis 302. The first orientation may be designated by the build plan, as described in more detail with reference to FIG. 8. The first robotic arm 104 is also able to translate the plate 132 along the vertical axis 302, and the lateral axis 304, and the longitudinal axis 306, providing six degrees of freedom.

Figure 4:
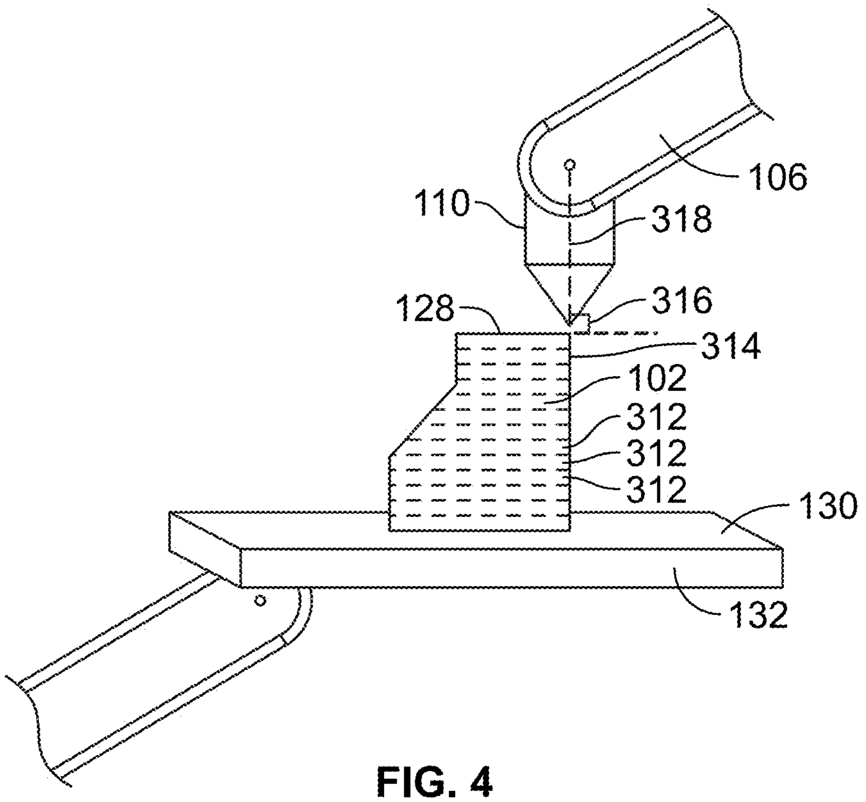
FIG. 4 illustrates a first intermediate stage of the additive manufacturing process with a build part held in a first orientation.

FIG. 4 illustrates a first intermediate stage of the additive manufacturing process with the build part 102 held in the first orientation. While the plate 132 is in the first orientation, the second robotic arm 106 controls the print head 110 to begin depositing source material (e.g., the source material 204 shown in FIG. 2) layer by layer to construct the build part 102 on the plate 132. The initial layers of source material may automatically bond to the plate 132 (e.g., as a weld), or an adhesive can be applied to the surface 130 prior to depositing the source material. FIG. 4 shows that the print head 110 has constructed a first section 314 or segment of the build part 102 on the surface 130 of the plate 132. The first section 314 may represent a main body of the build part. The print head 110 deposits the source material layer 312 by layer 312 in a stack to define the first section 314. The layers 312 are parallel to each other. In the illustrated embodiment, the layers 312 are also parallel to the surface 130 of the plate 132 and perpendicular to the vertical axis 302 (shown in FIG. 3), or within a designated tolerance range (e.g., 2 degrees, 5 degrees, 10 degrees, or the like) of perpendicular. With each successive addition of material to define another layer 312, the build part 102 grows taller in the vertical direction extending away from the plate 132. The surface layer 128 of the build part 102 defines an angle 316 relative to the print head 110. Specifically, the angle 316 is defined by a longitudinal axis 318 of the print head 110 along which the source material is emitted. The angle 316 is a right angle in the illustrated embodiment. The path of the print head 110 and other settings of the second robotic arm 106 for constructing the first section 314 of the build part 102 may be designated by the build plan.

Figure 5:
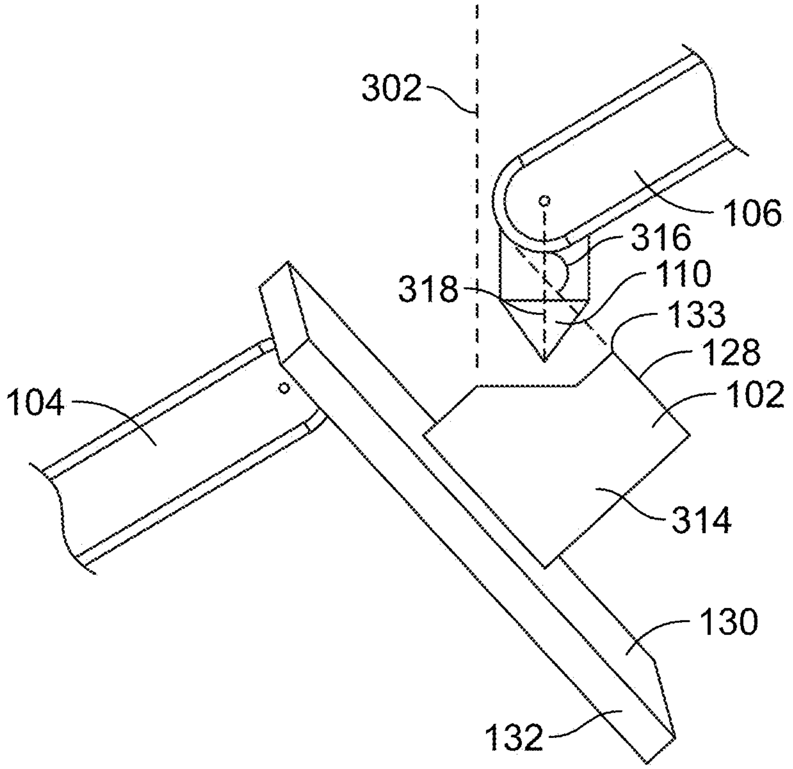
FIG. 5 illustrates a second intermediate stage of the additive manufacturing process with the build part held in a second orientation.

FIG. 5 illustrates a second intermediate stage of the additive manufacturing process with the build part 102 held in a second orientation. After the first section 314 of the build part 102 is completed, according to the build plan, the first robotic arm 104 reorients the build part 102 relative to the second robotic arm 106 and the floor to move from the first orientation to the second orientation. In the illustrated embodiment, the first robotic arm 104 may tilt or rotate the plate 132 (and the build part 102 thereon) about the longitudinal axis 306 (shown in FIG. 3) from the first orientation to achieve the second orientation. Optionally, the first robotic arm 104 may also rotate the plate 132 about the vertical axis 302 and/or the lateral axis 304 to achieve the second orientation. The second orientation may be designated by the build plan. Transitioning the build part 102 from the first orientation to the second orientation modifies the angle 316 of the surface layer 128 of the build part 102 relative to the print head 110. For example, the surface layer 128 of the first section 314 in the first orientation shown in FIG. 4 is perpendicular to the vertical axis 302, but the same surface layer 128 is oblique (e.g., not perpendicular or parallel) to the (longitudinal axis 318 of the) print head 110 in the second orientation shown in FIG. 5. The build part 102 is secured to the surface 130 of the plate 132, so the build part 102 remains fixed in position on the plate 132 even if the second orientation would cause an unsecured build part 102 to fall off the plate 132.

The first and/or second robotic arms 104, 106 may coordinate movements with each other to avoid collisions and enable depositing material at hard-to-access locations. For example, as the first robotic arm 104 tilts the plate 132 to achieve the orientation shown in FIG. 5, the second robotic arm 106 may be configured to translate and/or rotate the print head 110 to avoid a collision between the print head 110 and the left upper corner 133 of the build part 102. The collision avoidance is enhanced by the maneuverability of the robotic arms 104, 106 that allows for both translation and rotation in three-dimensions. Conventional 3-axis additive manufacturing apparatuses may not be able to avoid collisions between the print head and the build part when reorienting, which can damage the build part and/or substantially interfere with or impede the build process. Although only two robotic arms 104, 106 are shown in the illustrated embodiment, the coordinated movement for collision avoidance during reorientation can be utilized with more than two robots, such as three or four robotic arms working together to additively form a part. For example, the additive manufacturing system 100 can include the first robotic arm 104 that holds the build part 102, the second robotic arm 106 that holds the print head 110, a third robotic arm that holds another print head, and a fourth robotic arm that holds another print head or a finishing tool. The second, third and fourth robotic arms can concurrently operate to form the build part 102 that is held by the first robotic arm without collisions between the robotic arms or the components held by the robotic arms.

Figure 6:
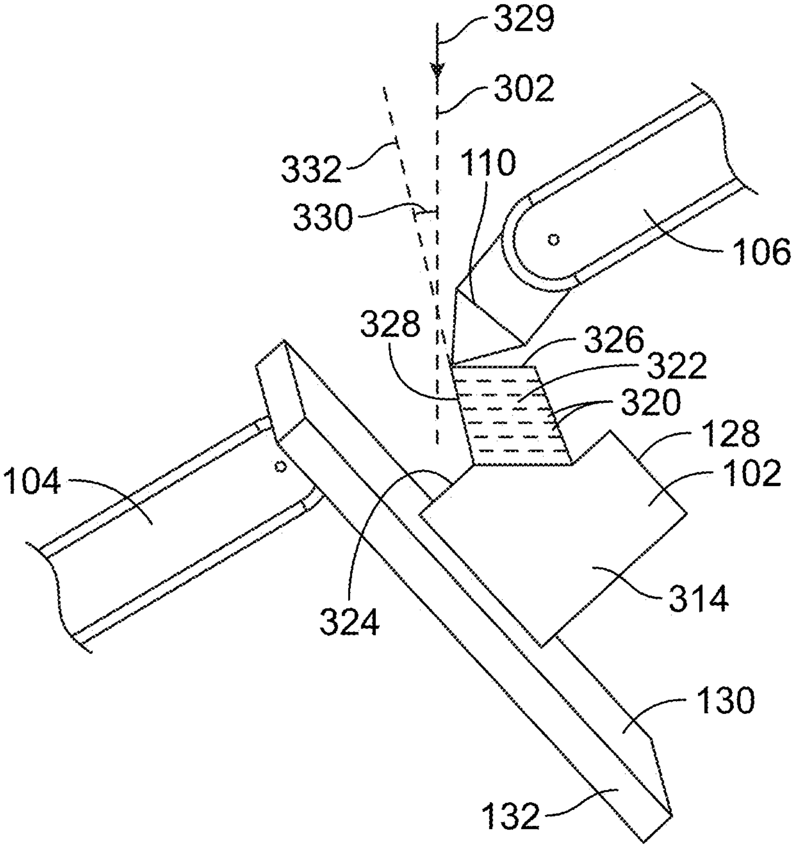
FIG. 6 illustrates a third intermediate stage of the additive manufacturing process with the build part held in the second orientation.

FIG. 6 illustrates a third intermediate stage of the additive manufacturing process with the build part 102 held in the second orientation. While the build part 102 is in the second orientation, the print head 110 is configured to deposit additional layers of the source material on the build part 102. For example, the second robotic arm 106 controls the print head 110 to deposit additional source material for constructing another section of the build part 102. In FIG. 6, the print head 110 deposits additional layers 320 to form a second section 322 that projects from a side 324 of the first section 314. The second section 322 can represent an appendage of the build part 102. The additional layers 320 are parallel to one another. The layers 320 are transverse to the surface 130 of the plate 132 and the layers 312 (shown in FIG. 4) of the first section 314, including the surface layer 128. In an embodiment, the layers 320 may be perpendicular to the vertical axis 302, or within a designated tolerance range (e.g., 2 degrees, 5 degrees, 10 degrees, or the like) of perpendicular. With each successive addition of material to define another layer 320, the second section 322 grows taller in the vertical direction extending away from the first section 314. The second robotic arm 106 may control the print head 110 to have a different angular orientation in FIG. 6 relative to the orientation in FIG. 5. Changing the orientation of the print head 110 during the build process is optional and may be performed to avoid collision with the build part 102, the plate 132, and/or the first robotic arm 104. Alternatively, the orientation of the print head 110 can be changed based on desired surface characteristics of the build part 102. For example, the deposited material may solidify differently when deposited at different angles.

In the illustrated embodiment shown in FIGS. 4 and 6, the print head 110 deposits the source material to construct the first section 314 of the build part 102 while the plate 132 and build part 102 are in the first orientation, and deposits the source material to construct the second section 322 (or appendage) of the build part 102 while the plate 132 and build part 102 are in the second orientation. Constructing the second section 322 at a different orientation than the first section 314 allows avoiding the formation of support material associated with the second section 322, without compromising build quality. For example, in the second orientation, a downskin surface 328 of the second section 322 is no greater than a threshold angle relative to the vertical axis 302. The vertical axis 302 is parallel to a gravitational force direction 329. The downskin surface 328 faces at least partially towards the plate 132. The threshold angle is associated with requiring support material underneath overhanging features. In non-limiting examples, the threshold angle can be 40 degrees, 45 degrees, 50 degrees, or the like. As shown in FIG. 6, an angle 330 defined between the vertical axis 302 (parallel to the gravitational force direction) and a tangent line 332 extending from the downskin surface 328 is less than a designated threshold angle. For this reason, the second robotic arm 106 controls the print head 110 to deposit source material to form the second section 322 without depositing additional source material to form supports underneath the downskin surface 328. For comparison purposes, if the appendage that is the second section 322 is formed with the plate 132 and the build part 102 in the first orientation as shown in FIGS. 3 and 4, the angle 330 would exceed the threshold angle so supports would be needed underneath the downskin surface 328 to achieve designated build quality. As described above, the formation of supports undesirably extend the duration of the build process and require post-build tasks to extract the support material from the build part 102.

The second robotic arm 106 can move the print head 110 relative to the build part 102 and the first robotic arm 104 during the build process to modify an angle of the print head 110 relative to the build part 102. For example, the second robotic arm 106 can manipulate the print head 110 to modify an angle of application at which the source material is deposited on the surface layer 326 of the second section 322. The angle of application may be selected based on material properties of the source material. Furthermore, the second robotic arm 106 may move the print head 110 relative to the build part 102 based on the design of the build part 102. For relatively complex shapes, the second robotic arm 106 can manipulate the print head 110 to access hard-to-reach areas of the build part 102 and/or to avoid colliding with projecting portions of the build part 102.

Optionally, after constructing the second section 322 of the build part 102, the first robotic arm 104 may once again reorient the build part 102 prior to the deposition of additional source material to form another section of the build part 102. For example, the first robotic arm 104 may move the plate 132 back to the first orientation or to a third orientation that is different from the first and second orientations.

Figure 7:
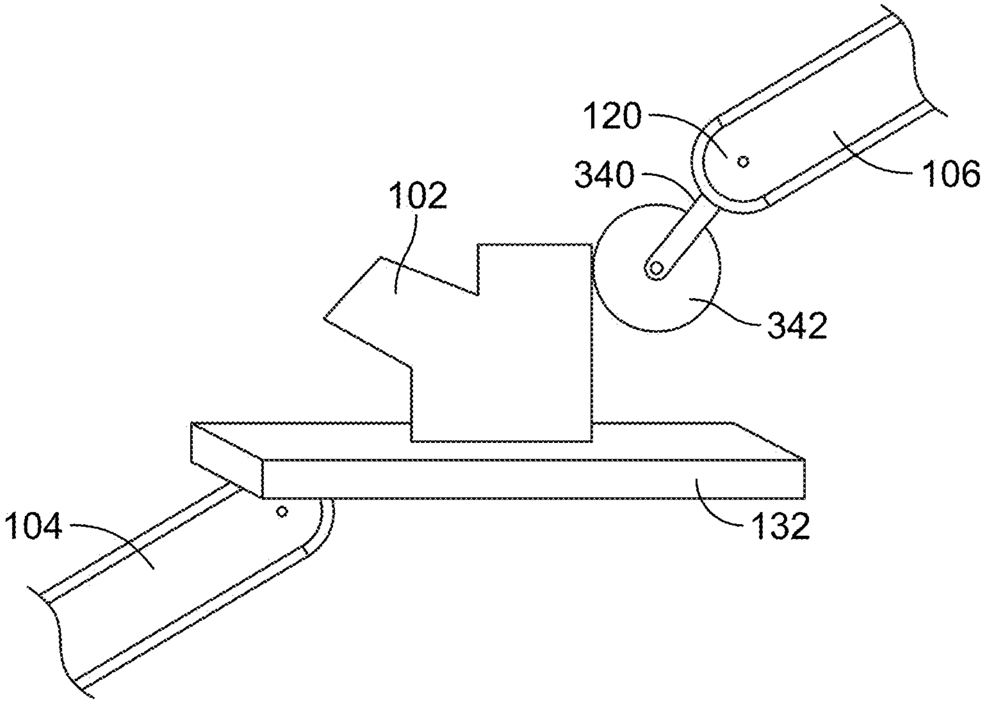
FIG. 7 illustrates a final stage of the additive manufacturing process in which finishing tasks are performed on the build part.

FIG. 7 illustrates a final stage of the additive manufacturing process in which finishing tasks are performed on the build part 102. The finishing tasks may be performed after the build part 102 is fully constructed. Optionally, at least some finishing tasks may be performed prior to completing the build process before the build part 102 is fully constructed. The finishing tasks can include grinding, sanding, polishing, buffering, cleaning, and/or the like. In FIG. 7, the second robotic arm 106 is mechanically coupled to a finishing instrument 340, and the second robotic arm 106 moves the finishing instrument 340 relative to the build part 102 to one or more of grind, sand, buff, polish, or clean the build part 102. For example, the finishing instrument 340 can include a buffing wheel (or polishing wheel) 342 that spins and engages surfaces of the build part 102 to smooth the surfaces. Another finishing instrument could include or represent a grinder that has a grinding element, a sander with sandpaper, a cleaner that applies and removes a cleaning solution, or the like. The second robotic arm 106 can be controlled to move the finishing instrument 340 relative to the build part 102 along a path (e.g., a finishing path) that is designated in the build plan. The first robotic arm 104 holds the plate 132 and the build part 102 in the first orientation in FIG. 7. Optionally, the first robotic arm 104 may be controlled to reorient the plate 132 and the build part 102 during the finishing tasks, similar to how the first robotic arm 104 reorients the build part 102 during the build process. Reorienting the build part 102 can enable the finishing instrument 340 to access hard-to-reach portions of the build part 102, such as narrow gaps, voids, and the like.

In a non-limiting example, the second robotic arm 106 may be configured to make quick-change substitutions of the devices held by the second robotic arm 106. For example, upon completing the build process, the second robotic arm 106 may move away from the build part 102, disconnect the print head 110 from the end 120 of the second robotic arm 106, and connect the finishing instrument 340 to the end 120 before returning to the build part 102 to perform a finishing task. In another example, the second robotic arm 106 may be configured to be mechanically and operably coupled to multiple end effectors at the same time, such as the print head 110 and the finishing instrument 340. The second robotic arm 106 can position the print head 110 in an active position of the robotic arm 106 when constructing the build part 102 and then rotate the end 120 to move the finishing instrument 340 into the active position for performing a finishing task.

In an alternative embodiment, the finishing instrument 340 may be separate and discrete from the second robotic arm 106. The finishing instrument 340 can be mechanically connected to a third robotic arm to perform the finishing task or tasks described above. Optionally, the third robotic arm may be controlled to move the finishing instrument 340 to perform a finishing task, such as polishing surfaces of the build part 102, concurrent with the second robotic arm 106 controlling the print head 110 to deposit additional layers of material on the build part 102 in a location spaced apart from the finishing instrument 340. By commencing the finishing tasks prior to completing the build process, the speed and efficiency of the additive manufacturing process can be increased relative to performing the build and finishing operations sequentially (e.g., waiting until the build part 102 is fully constructed prior to starting the finishing tasks). Commencing the finishing tasks prior to completing the build process also allows access to finish areas that may otherwise be obstructed by future additive features in the build sequence. For example, the finishing instrument 340 can smooth the inner surface of a cavity before subsequent layers of the build part are deposited which restrict access to the cavity.

Figure 8:
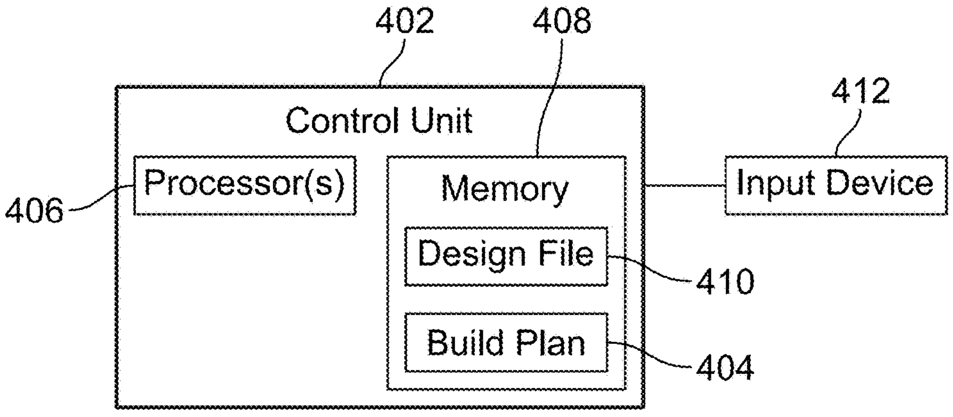
FIG. 8 is a block diagram showing a control unit of the additive manufacturing system shown in FIG. 1 according to an embodiment.

FIG. 8 is a block diagram showing a control unit 402 or controller of the additive manufacturing system 100 shown in FIG. 1 according to an embodiment. The control unit 402 may be disposed on a computing device that is discrete from the first robotic arm 104 and the second robotic arm 106, such as a computer, a workstation, or the like. Alternatively, the control unit 402 may be an integral component of the first robotic arm 104 or the second robotic arm 106. The control unit 402 may dictate the operations of the first and second robotic arms 104, 106 during the additive manufacturing process. For example, the operations may be defined in a build plan 404. The build plan 404 may designate a movement path for the first robotic arm 104 to move and orient the build part 102 and a deposition path for the second robotic arm 106 to move and control the print head 110 to deposit the source material on the build part 102. For example, the movement path may instruct the first robotic arm 104 how to manipulate the build part 102 to achieve the first orientation, the second orientation, and any additional orientations relative to the second robotic arm 106 and the floor 108. The deposition path may instruct the second robotic arm 106 to locate, orient, and move the print head 110 to deposit the source material layer by layer. The build plan 404 is associated with a specific design of the build part 102, such that implementing the movement path, the deposition path, and other settings prescribed in the build plan 404 produce the build part 102 having the specific design.

The control unit 402 represents hardware circuitry that includes and/or is connected with one or more processors 406 (e.g., one or more microprocessors, integrated circuits, microcontrollers, field programmable gate arrays, etc.) that perform operations described in connection with the control unit 402. The one or more processors 406 may operate based on programmed instructions. The one or more processors 406, which may include a single processor or multiple processors, are referred to herein in the plural form "processors" without limiting the scope to requiring multiple processors 406. The processors 406 can generate the build plan 404. The control unit 402 also includes a tangible and non-transitory computer-readable storage medium (e.g., memory) 408. The memory 408 may store the programmed instructions (i.e., software) that dictate the operations of the processors 406. For example, the memory 408 can store the build plan 404 that is generated by the processors 406 and can store additional build plans. The memory 408 may also store a part design file 410 of the build part 102. The part design file 410 may be a computer-aided design (CAD) file or another data file that describes the physical characteristics of the build part 102, such as the shape, size, and/or composition of the build part 102. The build plan 404 may be generated based on the design file 410.

In one or more embodiments, the control unit 402 receives a selection of a design for the build part. For example, the control unit 402 may be communicatively connected to an input device 412 from through which the design is selected. The input device 412 may include a touchpad, a touch-screen, a keyboard, a mouse, physical buttons, a joystick, or the like. The input device 412 enables an operator to provide commands to the additive manufacturing system 100. In a non-limiting example, the operator can use the input device 412 to select the design file 410, to initiate the build process, and/or to select or adjust additional settings and parameters. The processors 406 may be operably connected to the input device 412 via a wired or wireless communication pathway.

The processors 406 may generate the build plan 404 based on the selected design. For example, the processors 406 may access the design file 410 from the memory 408 and analyze the design file 410. The analysis may include determining whether the design includes voids, projecting features, and/or the like, that would typically require the formation of support material during the build process. For example, for a candidate or proposed position of the build part on the plate 132, the processors 406 may calculate the relative angles between downskin surfaces of projecting features and a vertical axis that is parallel to the force of gravity. The processors 406 can compare the relative angles to a designated threshold (such as, for example, 45 degrees), and determine that support material would be required if a relative angle exceeds the designated threshold.

In an embodiment, the processors 406 perform automated slicing of the build part design based, at least in part, on the analysis of whether support material would be required to support various features and/or voids of the build part. The automated slicing operation can include partitioning the design into different segments or sections that are to be constructed at different orientations of the build part. For example, voids and features of the design that are determined to require support material are partitioned from other sections of the design that would not require support material when oriented in the candidate or proposed orientation. Referring to FIG. 6, during the planning stage, the processors 406 may determine that the second section 322 of the build part 102 would require support material if constructed in the first orientation, so the processors 406 partition the second section 322 from the first section 314 to avoid constructing the second section 322 in the first orientation. The automated slicing can also include automated determination of other orientations of the build part to enable formation of all sections of the build part according to the selected design without requiring support material and while satisfying various other goals or standards (e.g., relating to efficiency and/or quality). For example, the processors 406 can select the second orientation that is shown in FIGS. 5 and 6 to enable the formation of the second section 322 without using support material.

After the automated slicing to partition the design of the build part and determine the orientations at which to form each partitioned section of the build part, the processors 406 may perform automated path planning based on the partitioned sections and the orientations. The automated path planning refers to determining the actual operations of the robotic arms 104, 106 to physically construct the build part 102 by constructing different sections at different associated orientations. The automated path planning includes the generation of the movement path for the first robotic arm 104 and the deposition path for the second robotic arm 106. The paths may include designated coordinates to which the robotic arms should move to at corresponding times. The movement path and the deposition path may incorporate the changes of orientation. For example, the movement path instructs the first robotic arm 104 to reorient the plate 132 and the build part 102 from the first orientation to the second orientation at a time that the second robotic arm 106, moving along the deposition path, completes the formation of the first section 314 of the build part 102 shown in FIG. 4. The movement and depositions paths, as well as parameters, conditions, settings, and/or other operations can be incorporated into the build plan 404.

For the build process, the control unit 402 may communicate the build plan 404 to the first and second robotic arms 104, 106 for the robotic arms 104, 106 to implement the build plan 404 in coordinated fashion. Alternatively, the control unit 402 may communicate command signals to the robotic arms 104, 106, such that the command signals are based on the build plan 404. The first and second robotic arms 104, 106 may move and operate to implement the command signals and thereby implement the build plan 404. Optionally, the control unit 402 may be configured to update or modify the build plan 404 during the build process. For example, the control unit 402 may be configured to re-plan the deposition path of the second robotic arm 106 in response to detecting a change in the orientation of the build part.

Figure 9:
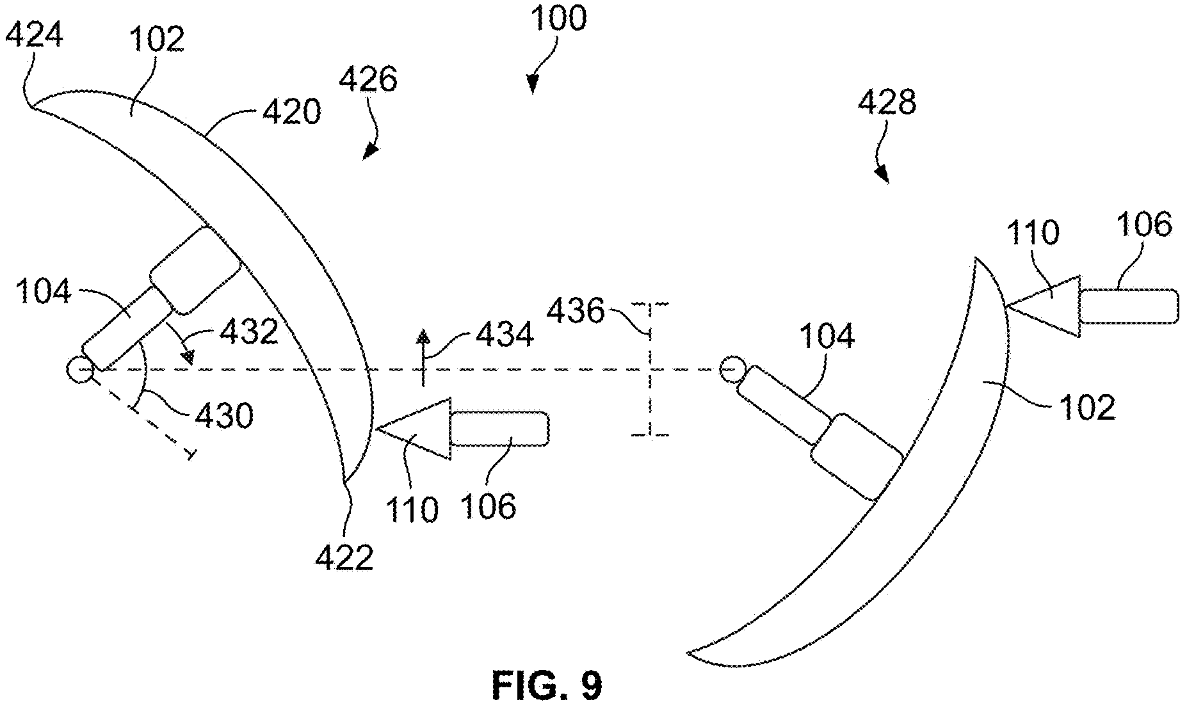
FIG. 9 illustrates the additive manufacturing system according to an embodiment in which first and second robotic arms concurrently move during the build process.

FIG. 9 illustrates the additive manufacturing system 100 according to an embodiment in which the first and second robotic arms 104, 106 concurrently move during the build process. For example, the first robotic arm 104 moves the build part 102 concurrent with movement of the print head 110 by the second robotic arm 106. The first robotic arm 104 can move along the movement path of the build plan while the second robotic arm 106 moves along the deposition path. The print head 110 can continuously deposit material onto the build part 102 as the build part 102 is moved by the first robotic arm 104.

In the illustrated embodiment, the build part 102 has an elongated, curved outer surface 420 extending from a first end 422 to an opposite, second end 424. FIG. 9 shows a first arrangement 426 of the components (e.g., the robotic arms 104, 106, build part 102, and print head 110) at a first time during the build process and a second arrangement 428 of the components at a second time during the build process. The illustrated embodiment shows that translating both the build part 102 and the print head 110 enables extending the print envelope (e.g., print coverage) to a size or length greater than the movement capability range of the second robotic arm 106 holding the print head 110. For example, in the first arrangement 426, the second robotic arm 106 positions the print head 110 to deposit material on the build part 102 proximate to the first end 422. During the intervening time between the first arrangement 426 and the second arrangement 428, the first robotic arm 104 translates the build part 102 relative to the print head 110 and the second robotic arm 106 concurrently translates the print head 110 relative to the build part 102. For example, the first robotic arm 104 pivots an angle 430 in a first direction 432 which causes the build part 102 to move in an arc. The second robotic arm 106 linearly moves the print head 110 in a second direction 434 for a distance 436 from the first arrangement 426 to the second arrangement 428. The curved movement of the build part 102 and linear movement of the print head 110 shown in FIG. 9 are merely for example, such that the build part 102 can be moved linearly and/or the print head 110 can be moved along a curved path in other embodiments.

In the second arrangement 428, the second robotic arm 106 positions the print head 110 to deposit material on the build part 102 proximate to the second end 424. In the illustrated embodiment, during the time from the first arrangement 426 to the second arrangement 428, the print head 110 continuously deposits material along the length of the outer surface 420 of the build part 102. The length of the outer surface 420 between the two locations of the print head 110 shown in FIG. 9 is longer than the distance 436 moved by the print head 110 and also longer than the distance moved by the build part 102. Moving the build part 102 and the print head 110 in generally opposite directions during the build process can extend the print envelope without requiring a larger structural footprint.

Figure 10:
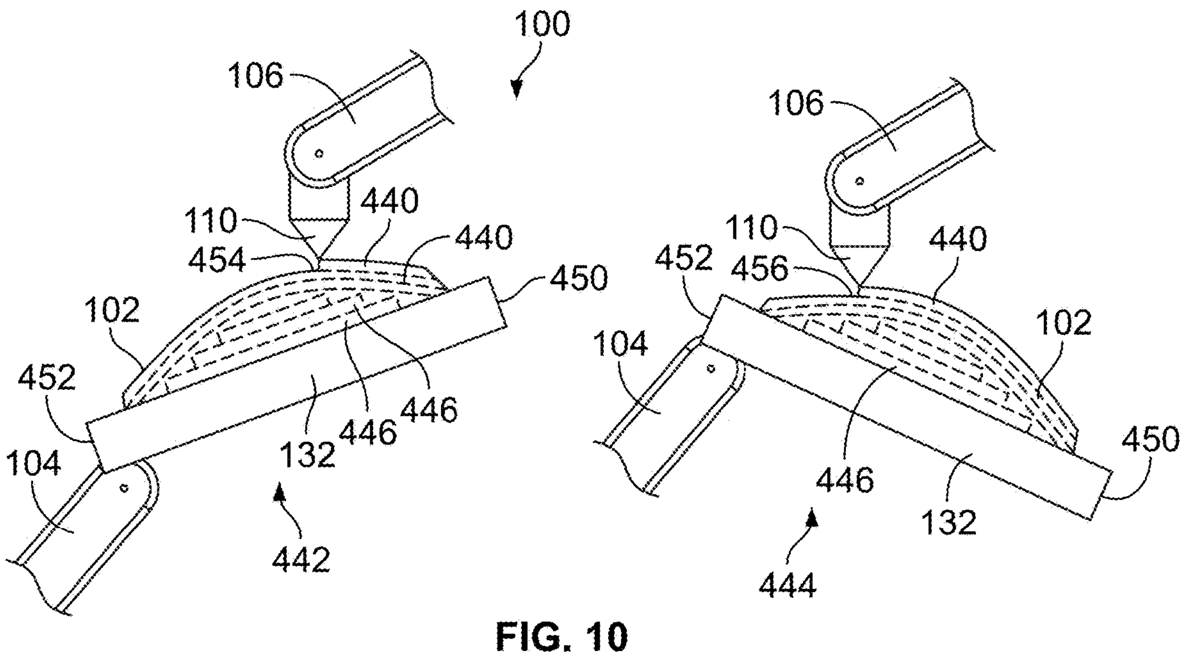
FIG. 10 illustrates the additive manufacturing system forming non-planar layers of the build part according to an embodiment.

FIG. 10 illustrates the additive manufacturing system 100 forming non-planar layers 440 of the build part 102 according to an embodiment. The build part 102 may have a non-planar, contoured surface. In a non-limiting example, the build part 102 may be an airfoil. Curved surfaces typically include small edges or steps when formed by parallel-stacked planar layers according to conventional additive manufacturing techniques. The edges or steps along the curved surfaces may have to be subsequently grinded to provide an acceptable smoothness of the surface. The quality of the curved surfaces can be improved during the build process by utilizing the additive manufacturing system 100 to deposit the material in non-planar layers, at least at the curved surfaces. Conventional additive manufacturing systems may not be able to build curved surfaces via non-planar layers due to orientation limitations of the hardware, collision issues with the build part due to relatively short extension of the print head nozzle, and/or the like. For example, most additive manufacturing systems only have three axes of motion and are limited to contours that are shallower in depth than the extension length of the nozzle. The robotic arms 104, 106 of the additive manufacturing system 100 can have six degrees of freedom, allowing for three-dimensional translation of a given component and rotation of the component about each of three mutually-perpendicular axes. Furthermore, the first and second robotic arms 104, 106 can reorient the build part 102 and the print head 110, respectively, to enable the print head 110 to access areas of the build part 102, without collision, that would not be achievable using conventional additive manufacturing systems.

FIG. 10 shows the build process at a first time 442 and a subsequent, second time 444. The print head 110 is depositing material to form different locations of a common non-planar layer 440 at the first and second times 442, 444. In the illustrated embodiment, the build part 102 is formed of both planar layers 446 and non-planar layers 440. For example, multiple planar layers 446 may be formed first on the plate 132. Optionally, the planar layers 446 may be formed while the first robotic arm 104 holds the plate 132 in a fixed orientation relative to the print head 110 and second robotic arm 106. The non-planar layers 440 are formed on top of the planar layers 446. In an embodiment, the first robotic arm 104 reorients the build part 102 relative to the print head 110 and second robotic arm 106 during the formation of the non-planar layers 440. For example, the build part 102 may be reoriented as the print head 110 deposits material onto the build part 102 to provide a desired application angle, such as to maintain the print head 110 oriented normal to the tangent of the surface on which the material is being deposited.

At the first time 442 in FIG. 10, the first robotic arm 104 holds the plate 132 with a right end 450 of the plate 132 disposed higher than an opposite, left end 452 of the plate 132. The orientation at the first time 442 allows the print head 110 to deposit material that is approximately (e.g., with 1, 2, 3, or 5 degrees of) normal to a first area 454 of the build part 102 on which the new material is deposited. At the second time 444, the first robotic arm 104 holds the plate 132 with the right end 450 of the plate 132 disposed lower than the left end 452. Due to the curve of the build part 102 and the progression of the build process, the print head 110 at the second time 444 deposits material approximately normal to a second area 456 of the build part 102 on which the new material is deposited. In an embodiment, the first and second robotic arms 104, 106 operate in tandem such that the second robotic arm 106 moves and/or controls the print head 110 to continuously deposit material while the first robotic arm 104 concurrently reorients the build part 102.

Figure 11:
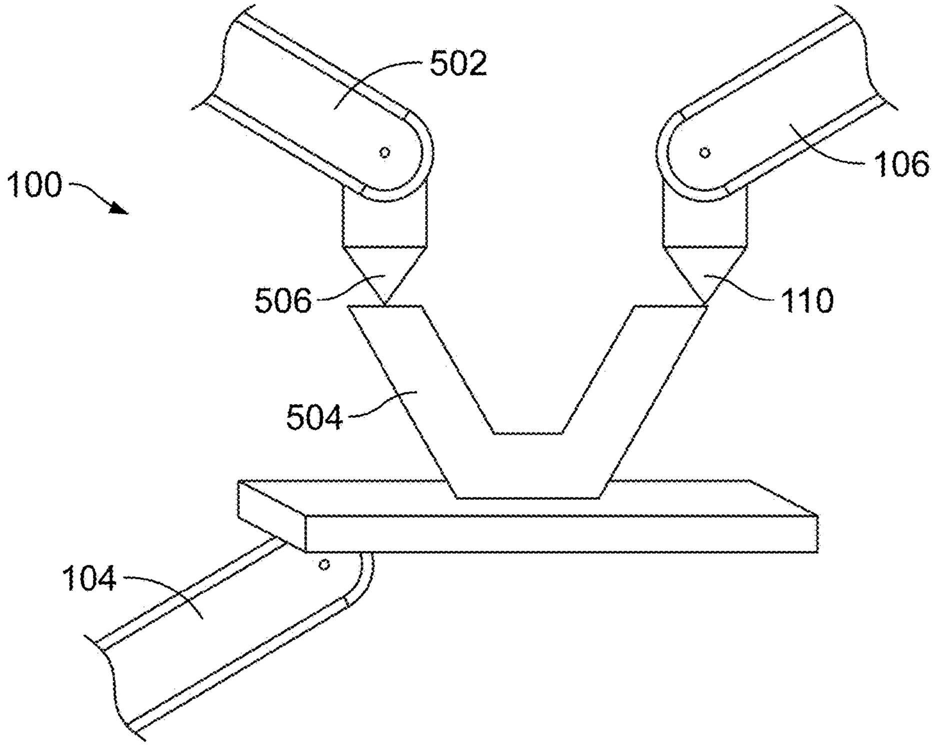
FIG. 11 illustrates the additive manufacturing system according to another embodiment in which the additive manufacturing system includes at least three robotic arms.

FIG. 11 illustrates the additive manufacturing system 100 according to another embodiment. The additive manufacturing system 100 in FIG. 11 utilizes three robotic arms 104, 106, 502 to construct a designated build part 504. The second robotic arm 106 is coupled to the print head 110, which is a first print head. A third robotic arm 502 is mechanically coupled to a second print head 506. Like the first and second robotic arms 104, 106, the third robotic arm 502 is able to manipulate and move the print head 506 in multiple degrees of freedom, such as six degrees of freedom, relative to other components (e.g., the robotic arms 104, 106). Both print heads 110, 506 are controlled to deposit the source material layer by layer on the build part 504 to construct the build part 504. Optionally, the build plan 404 shown in FIG. 8 can be generated to include a deposition path that is specific to the third robotic arm 502. The first and second print heads 110, 506 are configured to concurrently deposit the source material on the build part 504. The print heads 110, 506 may concurrently deposit source material along different areas of the build part 504 without interfering with each other. Utilizing multiple print heads 110, 506 to form a common build part 504 can drastically reduce the build time.

Figure 12:
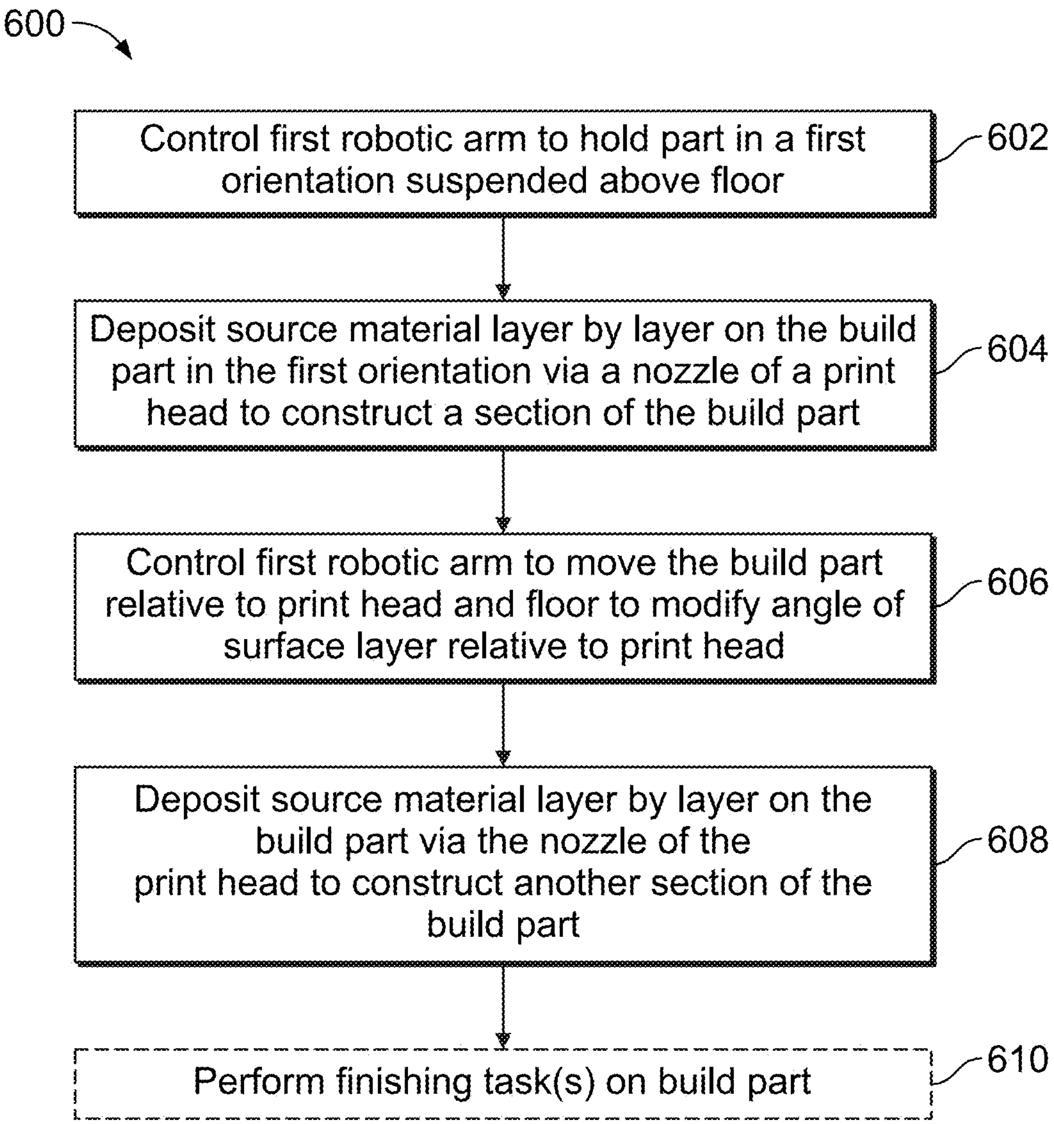
FIG. 12 is a flow chart of a method for additive manufacturing using robotic arms to modify an orientation of the build part during the build process according to an embodiment.

FIG. 12 is a flow chart of a method 600 for additive manufacturing using robotic arms to modify an orientation of the build part during the build process according to an embodiment. In an example, the method 600 is performed by the additive manufacturing system 100 shown in FIG. 1, including the control unit 402 shown in FIG. 8. Optionally, some operator input can be provided in one or more of the steps. Optionally, the method 600 may include more steps than shown in FIG. 12, fewer steps than shown in FIG. 12, different steps that are not shown in FIG. 12, and/or a different arrangement or order of the steps than shown in FIG. 12.

The method 600 begins at 602, at which a first robotic arm is controlled to hold a build part in a first orientation suspended above a floor or ground. The first robotic arm may directly couple to the build part or may directly couple to a plate on which the build part is constructed and/or affixed. At 604, a source material is deposited layer by layer on the build part in the first orientation via a nozzle of a print head to construct a section (e.g., a first section) of the build part. The initial layer of the build part may be deposited directly on a surface of the plate held by the first robotic arm. The print head may be coupled to a second robotic arm that moves the print head relative to the build part, the first robotic arm, and the floor or ground to deposit the source material onto the build part. The movement of the second robotic arm can modify an angle of the print head relative to the build part. Optionally, a second print head may concurrently deposit the source material onto the build part with the first print head. The second print head may be coupled to a third robotic arm that is controlled to move relative to the first and second robotic arms without physically contacting or otherwise interfering with the first and second robotic arms. Utilizing multiple print heads and multiple robots to construct the build part can significantly reduce the build time.

At 606, the first robotic arm is controlled to move the build part relative to the print head and the floor during the build process to modify an angle of a surface layer of the build part relative to the print head and the floor. In an example, the first robotic arm is controlled to reorient the build part to a second orientation relative to the floor or ground after the section of the build part is constructed. The first robotic arm may tilt the build part about at least one of three mutually-perpendicular axes from the first orientation to the second orientation.

At 608, the source material is deposited layer by layer on the build part in the second orientation to construct another section (e.g., a second section) of the build part. The set of layers of the build part that are deposited when the build part is in the second orientation may be transverse to the set of layers deposited when the build part is in the first orientation. The additional layers are deposited by at least the first print head. The second print head optionally can be controlled to operate in tandem with the first print head.

Optionally, after depositing the layers of source material on the build part in the second orientation, the first robotic arm may be controlled to reorient the build part again to a third orientation or back to the first orientation. After the repositioning, the second robotic arm may be controlled to once again use the print head to deposit additional layers of source material on the build part, and this process may repeat until the construction of the build part is completed.

Optionally, the method 600 may include, at 610, performing one or more secondary finishing tasks on the build part after the build part is constructed. One or more finishing tasks may be performed after the build part is fully constructed. Optionally, at least some finishing tasks may be performed prior to completing the build process before the build part is fully constructed. The method may include mechanically coupling a finishing instrument to the second robotic arm, and then controlling the second robotic arm to move the finishing instrument relative to the build part for the finishing instrument to engage the build part. The finishing instrument can represent or include a grinder, a polishing wheel, a buffing wheel, a sander, a cleaning device, or the like. In a non-limiting example, the second robotic arm may be configured to replace the print head with the finishing instrument after the build process is complete. In another embodiment, the finishing instrument is coupled to, and controlled by, another robotic arm (e.g., a third or fourth robotic arm) instead of the second robotic arm that includes the print head. The finishing tasks can represent or include removing build supports from the build part, surface finishing (e.g., grinding, polishing, sanding, cleaning, and/or the like), adding and/or cleaning holes in the build part, removing the base plate, grinding the base plate, and/or the like.

Optionally, the method 600 may also include generating a build plan for additively manufacturing the build part. The build plan can be generated by one or more processors of a control unit (or controller). The build plan can be based on an analysis of a design of the build part and a proposed or candidate position of the build part that represents the location and orientation relative to the plate at which the build part is to be constructed. As a result of the analysis, the build plan may select the first and second orientations and all additional orientations of the build part during the build process. The build plan can designate a movement path for the first robotic arm to move the build part during the build process to achieve the various selected orientations at designated times. The build plan can also designate a deposition path for the second robotic arm to move the print head to deposit the source material during the build process. The deposition plan can account for the reorientation of the build part at the designated times. For example, at each of the designated times, the second robotic arm may reorient (e.g., translate and/or rotate) the print head relative to the first robotic arm to get into position for constructing the second section of the build part.

The build plan can be generated to achieve certain goals, such as to avoid or at least reduce the amount of support material formed during the build process that will need to be extracted from the build part. For example, the build part design may include a projecting feature or appendage that projects from a main body of the build part. The second orientation may be selected to prevent a downskin surface of the appendage from being oriented greater than a threshold angle relative to vertical (e.g., a gravitational force direction). The threshold angle can be 40 degrees, 45 degrees, 50 degrees, or the like. The threshold angle is associated with requiring support material underneath the downskin surface. By reorienting the build part such that the downskin surface of the appendage is no greater than the threshold angle, the appendage can be constructed while the build part is in the second orientation without forming support material underneath the downskin surface. The appendage can represent the additional section of the build part that is constructed in step 608. In one or more embodiments, the build plan selects multiple orientations for the build part during the build process to avoid the formation of support material without compromising the quality of the build part. By eliminating or reducing the amount of support material formed, the manufacturing efficiency can be increased and costs reduced by increasing the speed of the build process, reducing material waste, and alleviating post-build finishing tasks. The finishing tasks that may be alleviated include extracting the support material from the build part and smoothing the surfaces of the build part that were formerly attached to the support material, via grinding, sanding, buffing, polishing, or the like.

While various spatial and directional terms, such as top, bottom, lower, mid, lateral, horizontal, vertical, front and the like are used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The diagrams of embodiments herein illustrate one or more control or processing units, such as the control unit 402 shown in FIG. 8. It is to be understood that the control or processing units represent circuits, circuitry, or portions thereof that are implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. The hardware can include electronic circuits that include and/or are connected to one or more logic-based devices, such as microprocessors, processors, controllers, or the like. Optionally, the control unit 402, or the one or more processors 406 thereof, represents processing circuitry such as one or more of a field programmable gate array (FPGA), application specific integrated circuit (ASIC), microprocessor(s), a quantum computing device, and/or the like. The circuits in various embodiments are configured to execute one or more algorithms to perform functions described herein. The one or more algorithms include aspects of embodiments disclosed herein, whether or not expressly identified in a flowchart or a method.

As used herein, the term "control unit," or the like includes any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. The control unit 402 shown in FIG. 8 is configured to execute a set of instructions that are stored in one or more storage elements (such as one or more memories), in order to process data. The set of instructions includes various commands that instruct the control unit 402 (e.g., the processor (s) 406 thereof) as a processing machine to perform specific operations such as the methods and processes of the various embodiments of the subject matter described herein. In an embodiment, the set of instructions is in the form of a software program. The processing of input data by the processing machine is in response to user commands, in response to results of previous processing, or in response to a request made by another processing machine. As used herein, the term "software" includes any computer program stored in memory for execution by a computer, including but not limited to RAM memory, ROM memory, EPROM memory, EEPROM memory, and non-volatile RAM (NVRAM) memory.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An additive manufacturing system comprising:

a first robotic arm configured to hold a build part suspended above a floor during a build process, wherein the build part includes an appendage that projects from a main body of the build part;

a print head with a nozzle configured to deposit source material layer by layer on the build part during the build process to construct the build part;

a second robotic arm mechanically coupled to the print head; and one or more processors configured to generate a build plan for additively manufacturing the build part during the build process, the build plan designating a movement path for the first robotic arm to move the build part and a deposition path for the print head to deposit the source material during the build process, wherein the first robotic arm is controlled, according to the movement path of the build plan, to reorient the build part from a first orientation to a second orientation relative to the print head and the floor during the build process to modify an angle of a surface layer of the build part relative to the print head and the floor, wherein the one or more processors are further configured to determine the second orientation of the build part so that an angle defined between a downskin surface of the appendage and a gravitational force direction is less than a threshold angle to avoid forming a support underneath the appendage during the build process, wherein the print head is controlled, according to the build plan, to deposit a first amount of the source material on the build part prior to the first robotic arm reorienting the build part to form, upon the first amount solidifying, a first set of layers of the build part while the build part is in the first orientation, and to deposit a second amount of the source material after the first robotic arm reorients the build part to form, upon the second amount solidifying, a second set of layers of the build part while the build part is in the second orientation, wherein the first set of layers of the build part is transverse to the second set of layers of the build part.

2. The additive manufacturing system of claim 1, wherein the second robotic arm is controlled, according to the build plan, to move the print head relative to the first robotic arm and the floor during the build process to modify an angle of the print head relative to the build part.

3. The additive manufacturing system of claim 2, wherein the second robotic arm is controlled, according to the build plan, to move the print head concurrent with the first robotic arm reorienting the build part from the first orientation to the second orientation.

4. The additive manufacturing system of claim 1, wherein the first robotic arm is configured to reorient the build part by tilting the build part about an axis from the first orientation to the second orientation.

5. The additive manufacturing system of claim 1, wherein the print head is a first print head and the additive manufacturing system further comprises a second print head and a third robotic arm that is mechanically coupled to the second print head, wherein the second and third robotic arms are configured to concurrently move the first and second print heads, respectively, during the build process, and the first and second print heads are configured to concurrently deposit the source material on the build part.

6. The additive manufacturing system of claim 1, further comprising a finishing instrument mechanically coupled to one of the second robotic arm or a third robotic arm, wherein, after the build process, the second robotic arm or the third robotic arm moves the finishing instrument relative to the build part for the finishing instrument to one or more of grind, sand, buff, polish, or clean the build part.

7. The additive manufacturing system of claim 1, wherein the first robotic arm is configured to rotate the build part about three mutually-perpendicular axes and translate the build part along the three mutually-perpendicular axes.

8. The additive manufacturing system of claim 1, wherein the first robotic arm is mechanically coupled to a plate and the build part is secured to a surface of the plate, wherein the first robotic arm indirectly holds the build part via the plate.

9. The additive manufacturing system of claim 1, wherein the print head is controlled, according to the build plan, to deposit the source material concurrent with the first robotic arm reorienting the build part to modify the angle of the surface layer.

10. The additive manufacturing system of claim 9, wherein the surface layer of the build part is non-planar.

11. The additive manufacturing system of claim 1, wherein the print head is controlled, according to the build plan, to deposit the first amount of the source material on the build part and to deposit the second amount of the source material on the build part so that the first set of layers of the build part includes multiple parallel layers that are stacked one directly on top of another without any intervening layers that are not part of the first set, and the second set of layers of the build part includes multiple parallel layers that are stacked one directly on top of another without any intervening layers that are not part of the second set.

12. An additive manufacturing system comprising:

a first robotic arm configured to hold a build part suspended above a floor during a build process, wherein the build part has an appendage that projects from a main body of the build part;

a second robotic arm mechanically coupled to a print head, the print head configured to deposit source material layer by layer on the build part during the build process to construct the build part; and one or more processors communicatively connected to the first and second robotic arms and the print head, the one or more processors configured to:

control the first robotic arm to move the build part from a first orientation to a second orientation relative to the print head and the floor during the build process to modify an angle of a surface layer of the build part;

determine the second orientation of the build part so that an angle defined between a downskin surface of the appendage and a gravitational force direction is less than a threshold angle to avoid forming a support underneath the appendage during the build process;

control the second robotic arm to move the print head relative to the build part and the floor during the build process;

control the print head to deposit a first amount of the source material while the build part is in the first orientation to form, upon the first amount solidifying, a first set of layers of the build part; and control the print head to deposit a second amount of the source material while the build part is in the second orientation to form, upon the second amount solidifying, a second set of layers of the build part, wherein the first set of layers of the build part is transverse to the second set of layers of the build part.

13. The additive manufacturing system of claim 12, wherein the one or more processors are configured to control the print head to deposit the first amount of the source material and to deposit the second amount of the source material so that the first set of layers of the build part includes multiple parallel layers that are stacked one directly on top of another without any intervening layers that are not part of the first set, and the second set of layers of the build part includes multiple parallel layers that are stacked one directly on top of another without any intervening layers that are not part of the second set.

14. The additive manufacturing system of claim 12, wherein the one or more processors are configured to control the print head to deposit the source material on the build part concurrent with the first robotic arm moving the build part from the first orientation to the second orientation to modify the angle of the surface layer.

15. The additive manufacturing system of claim 14, wherein the surface layer of the build part is non-planar.

16. The additive manufacturing system of claim 12, wherein the print head is a first print head and the additive manufacturing system further comprises a third robotic arm mechanically coupled to a second print head, the second print head configured to deposit the source material layer by layer on the build part during the build process, wherein the one or more processors are configured to control the third robotic arm to move the second print head relative to the build part and the first print head during the build process.

17. The additive manufacturing system of claim 16, wherein the one or more processors are configured to control the first and second print heads to concurrently deposit at least one of (i) the first amount of the source material to form the first set of layers or (ii) the second amount of the source material to form the second set of layers.

18. The additive manufacturing system of claim 12, wherein each of the first robotic arm and the second robotic arm comprises a base section, an intermediate elongated member, a distal elongated member, and an end, wherein the intermediate elongated member is mechanically coupled between the base section and the distal elongated member and the end is mechanically coupled to the distal elongated member.

19. An additive manufacturing system comprising:

a first robotic arm configured to hold a build part suspended above a floor during a build process, wherein the build part has an appendage that projects from a main body of the build part;

a second robotic arm mechanically coupled to a print head, the print head configured to deposit source material layer by layer on the build part during the build process to construct the build part; and one or more processors communicatively connected to the first and second robotic arms and the print head, the one or more processors configured to:

control the first robotic arm to move the build part from a first orientation to a second orientation relative to the print head and the floor during the build process to modify an angle of a surface layer of the build part; and determine the second orientation of the build part so that an angle defined between a downskin surface of the appendage and a gravitational force direction is less than a threshold angle to avoid forming a support underneath the appendage during the build process.

20. The additive manufacturing system of claim 19, wherein the one or more processors are further configured to:

control the print head to deposit a first amount of the source material while the build part is in the first orientation to form a first set of layers of the build part; and control the print head to deposit a second amount of the source material while the build part is in the second orientation to form a second set of layers of the build part.

* * * * *